United States Patent

(12) United States Patent
Jia

(10) Patent No.: US 11,570,338 B2
(45) Date of Patent: Jan. 31, 2023

(54) LIGHT-CONCENTRATING DEVICE, LIGHT-CONCENTRATING DISPLAY SCREEN, AND MOBILE ELECTRIC PRODUCT

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 261 days.

(21) Appl. No.: 16/900,306

(22) Filed: Jun. 12, 2020

(65) Prior Publication Data
US 2021/0099621 A1 Apr. 1, 2021

(30) Foreign Application Priority Data
Sep. 27, 2019 (CN) .......................... 201910925824.2

(51) Int. Cl.
*G02F 1/13357* (2006.01)
*H04N 5/225* (2006.01)
*G02F 1/1335* (2006.01)

(52) U.S. Cl.
CPC ..... *H04N 5/2254* (2013.01); *G02F 1/133602* (2013.01); *H04N 5/2257* (2013.01); *G02F 1/133601* (2021.01); *G02F 2201/52* (2013.01)

(58) Field of Classification Search
CPC ............................................... G02F 1/133601
See application file for complete search history.

(56) References Cited

U.S. PATENT DOCUMENTS

2009/0257111 A1 10/2009 Heikenfeld et al.
2010/0195190 A1* 8/2010 Ishioka ................. H04N 13/398
349/200

(Continued)

FOREIGN PATENT DOCUMENTS

CN 1791823 A 6/2006
CN 100381860 C 4/2008
(Continued)

OTHER PUBLICATIONS

International search report from International patent office in a counterpart International patent Application PCT/CN2020/101956, dated Oct. 12, 2020 (10 pages).

(Continued)

*Primary Examiner* — Edmond C Lau
(74) *Attorney, Agent, or Firm* — Young Basile Hanlon & MacFarlane, P.C.

(57) ABSTRACT

A light-concentrating device, a light-concentrating display screen, and an electric product are provided. The light-concentrating device includes a light-concentrating plate. The light-concentrating plate includes dimming units, each dimming unit including a house, the house being filled with first light-transmissive liquid and second light-transmissive liquid insoluble with each other. Light may be refracted when passing through the interface between the first light-transmissive liquid and the second light-transmissive liquid. Adjustment electrodes are provided on sides of the house, and a common electrode layer is provided at an end of the house. The voltages may be applied between the common electrode layer and the adjustment electrodes on the sides of the house.

19 Claims, 11 Drawing Sheets

(56) References Cited

U.S. PATENT DOCUMENTS

| | | |
|---|---|---|
| 2011/0299171 A1 | 12/2011 | Sato et al. |
| 2013/0120827 A1 | 5/2013 | Takai et al. |
| 2015/0015816 A1 | 1/2015 | Bae et al. |
| 2015/0109755 A1* | 4/2015 | Noguchi ........... G02F 1/133536 362/19 |
| 2018/0088345 A1 | 3/2018 | Won et al. |

FOREIGN PATENT DOCUMENTS

| | | | |
|---|---|---|---|
| CN | 101165511 | A | 4/2008 |
| CN | 101310320 | A | 11/2008 |
| CN | 101421642 | A | 4/2009 |
| CN | 100568332 | C | 12/2009 |
| CN | 102981265 | A | 3/2013 |
| CN | 103105673 | A | 5/2013 |
| CN | 102576096 | B | 3/2015 |
| CN | 104429065 | A | 3/2015 |
| CN | 104570330 | A | 4/2015 |
| CN | 105009583 | B | 12/2017 |
| CN | 106125268 | B | 8/2018 |
| CN | 108469704 | A | 8/2018 |
| CN | 108600465 | A | 9/2018 |
| CN | 108732728 | A | 11/2018 |
| CN | 108810207 | A | 11/2018 |
| CN | 109073792 | A | 12/2018 |
| CN | 109491007 | A | 3/2019 |
| CN | 106791334 | B | 4/2019 |
| CN | 105100589 | B | 5/2019 |
| CN | 209089023 | U | 7/2019 |
| CN | 110276227 | A | 9/2019 |
| CN | 110632752 | A | 12/2019 |
| CN | 110676273 | A | 1/2020 |
| EP | 1906214 | A1 | 4/2008 |
| EP | 3288083 | A2 | 2/2018 |
| WO | 2006027746 | A1 | 3/2006 |
| WO | 2009100584 | A1 | 8/2009 |

OTHER PUBLICATIONS

Chinese Rejection decision with English Translation for CN Application 2019109258242 dated Sep. 15, 2021. (14 pages).
Extended European Search Report for EP Application 20186683.7 dated Feb. 8, 2021. (11 pages).
China First Office Action with English Translation for CN Application 201910925824.2 dated Mar. 1, 2021. (17 pages).
Chinese Second Office Action with English Translation for CN Application 201910925824.2 dated Jun. 30, 2021. (17 pages).
Indian Examination Report for IN Application 202014027745 dated Jul. 5, 2021. (6 pages).
European Examination Report for European Application No. 20186683.7 dated Sep. 12, 2022 (6 pages).

* cited by examiner

LIGHT-CONCENTRATING DEVICE, LIGHT-CONCENTRATING DISPLAY SCREEN, AND MOBILE ELECTRIC PRODUCT

CROSS-REFERENCE TO RELATED APPLICATION(S)

The present application claims priority to Chinese patent application No. 201910925824.2, filed on Sep. 27, 2019, the entire contents of which are hereby incorporated by reference in their entireties.

TECHNICAL FIELD

The present disclosure relate to the field of optical technology, and more particularly to light-concentrating devices, light-concentrating display screens, and electric products.

BACKGROUND

Current camera modules generally perform focusing and light concentration through lenses. For mobile terminals with limited positions for installation, such as smartphones and tablet computers, camera module structures are largely affected by lens light-concentrating angles and lens sizes. Especially for an under-screen camera module, the camera module has a deeper position, a smaller light extraction angle and a smaller amount of light extraction, which affects the shooting quality.

SUMMARY

A light-concentrating device is provided. The light-concentrating device comprises: a light-concentrating plate. The light-concentrating plate comprises a plurality of dimming units arranged in an array, and each of the plurality of dimming units comprises: a house, wherein the house comprises a first wall, a second wall opposite to the first wall, and a side wall connected to both the first wall and the second wall, and the house allows light to pass through at least from the first wall to the second wall; a first light-transmissive liquid filled in the house, wherein the first light-transmissive liquid is a conductive liquid; a first electrode layer located on the second wall, wherein the first electrode layer allows the light to pass through; and an adjustment electrode located on the side wall of the house, wherein the adjustment electrode is insulated from the first electrode layer.

A light-concentrating display screen is provided. The light-concentrating display screen comprises a transparent display panel, a reflective layer located on the transparent display panel and comprising a light-transmissive structure, and a light-concentrating device comprising a light-concentrating plate located on the transparent display panel. The light-concentrating plate comprises a plurality of dimming units arranged in an array, and each of the plurality of dimming units comprises: a house, wherein the house comprises a first wall, a second wall opposite to the first wall, and a side wall connected to both the first wall and the second wall; and the house allows light to pass through at least from the first wall to the second wall; a first light-transmissive liquid filled in the house, wherein the first light-transmissive liquid is a conductive liquid; a first electrode layer located on the second wall, wherein the first electrode layer allows the light to pass through; and an adjustment electrode located on the side wall of the house, wherein the adjustment electrode is insulated from the first electrode layer.

An electric product is provided. The electric product comprises a camera module and a light-concentrating display screen. The light-concentrating display screen comprises a transparent display panel, a reflective layer located on the transparent display panel and comprising a light-transmissive structure, and a light-concentrating device comprising a light-concentrating plate located on the transparent display panel; the camera module being located on a corresponding position of the light-transmissive structure. The light-concentrating plate comprises a plurality of dimming units arranged in an array, and each of the plurality of dimming units comprises: a house, wherein the house comprises a first wall, a second wall opposite to the first wall, and a side wall connected to both the first wall and the second wall; and the house allows light to pass through at least from the first wall to the second wall; a first light-transmissive liquid filled in the house, wherein the first light-transmissive liquid is a conductive liquid; a first electrode layer located on the second wall, wherein the first electrode layer allows the light to pass through; and an adjustment electrode located on the side wall of the house, wherein the adjustment electrode is insulated from the first electrode layer.

BRIEF DESCRIPTION OF DRAWINGS

In order to illustrate the technical solution in the embodiment of the present disclosure more clearly, a brief description to the drawings needed in the embodiment or the prior art are given in the following. Obviously, the figures in the following description are only some embodiments of the present disclosure. For those skilled in the art, they can also obtain other figures according to these drawings and without any creative work.

DETAILED DESCRIPTION

Figure 1:
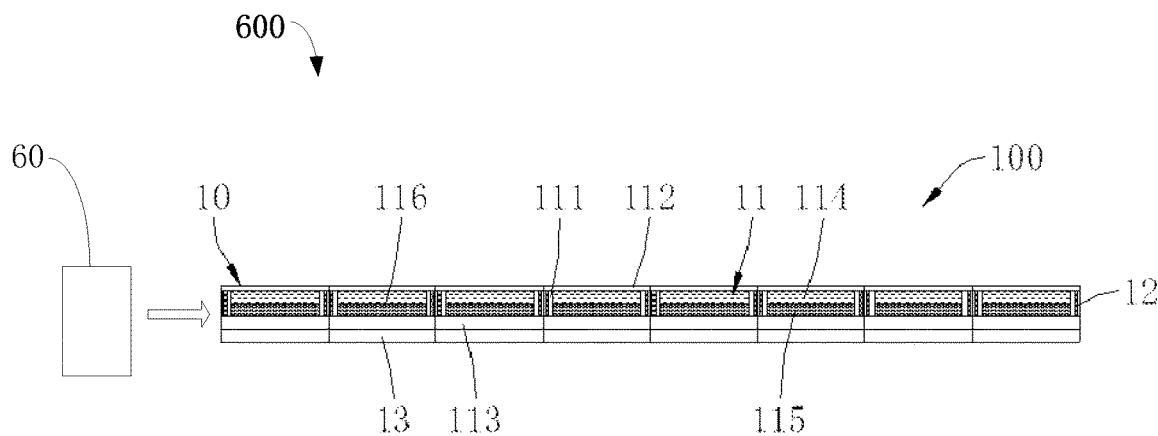
FIG. 1 is a cross-sectional structural diagram of a light-concentrating plate according to one embodiment of the present disclosure.

In order to make the technical problems to be solved, the technical solutions and the advantage of the present disclosure clearer, the present disclosure will be further described in detail by accompanying the drawings and embodiments. It should be understood that the specific embodiments described herein are only used to interpret the present disclosure and are not used to limit the scope of the present disclosure.

It should be noted that when a component is stated as "located on" or "disposed on" or "provided on" another component, it can be directly or indirectly in contact with another component. When a component is stated "connected to" another component, it can be directly connected to another component or indirectly connected to another component.

In addition, the terms "first" and "second" are used for descriptive purposes only and cannot be understood as indicating or implying relative importance or implying the number of indicated technical features. Thus, a feature limited by "first" or "second" may explicitly or implicitly include one or more such features. In the description of this disclosure, "multiple" means two or more, unless otherwise defined. "Several" means one or more, unless otherwise defined.

In the description of the present disclosure, it should be noted that unless it is specified and defined, the terms "installation", "connect to" and "connection" should be understood in a broad sense, for example, they can be fixed connection, detachable connection, or integrated connection; they can be mechanical connection, or electrical connection; they can be directly connection, or they can be indirectly connection through an intermediate media; they can be the internal connection between two components or the interaction between two components. For those of ordinary skill in the art, the specific meaning of the above terms in the present disclosure can be understood according to the specific situation.

Referring to "one embodiment" or "an embodiment" throughout the specification means that specific features, structures or properties described in the embodiments are included in at least one embodiment of the present disclosure. Therefore, the phrases "in one embodiment" or "in some embodiments" or "in embodiment" appear in various parts of the specification, and not all references are the same embodiment. In addition, in one or more embodiments, specific features, structures, or characteristics may be combined in any suitable manner.

Abbreviations employed in the present disclosure are as follows:

LED: Light Emitting Diode.
OLED: Organic Light-Emitting Diode.
ITO: Indium tin oxide.
CF: Color Filter.

In one embodiment, a light-concentrating device is provided. The light-concentrating device comprises: a light-concentrating plate. The light-concentrating plate comprises a plurality of dimming units arranged in an array, and each of the plurality of dimming units comprises: a house, wherein the house comprises a first wall, a second wall opposite to the first wall, and a side wall connected to both the first wall and the second wall, and the house allows light to pass through at least from the first wall to the second wall; a first light-transmissive liquid filled in the house, wherein the first light-transmissive liquid is a conductive liquid; a first electrode layer located on the second wall, wherein the first electrode layer allows the light to pass through; and an adjustment electrode located on the side wall of the house, wherein the adjustment electrode is insulated from the first electrode layer.

In one embodiment, the first wall is a light-transmissive layer, the second wall is an insulating layer, and the first electrode layer is located on a side of the insulating layer facing away from the first wall; and the plurality of dimming units share a common light-transmissive layer, a common insulating layer, and a common first electrode layer.

In one embodiment, each of the plurality of dimming units further comprises a second light-transmissive liquid filled in the house, wherein the second light-transmissive liquid is a non-conductive liquid, and the first light-transmissive liquid and the second light-transmissive liquid are insoluble with each other; a first affinity between the second wall and the second light-transmissive liquid is different from a second affinity between the second wall and the first light-transmissive liquid.

In one embodiment, the house comprises four side walls, and each of the four side walls are provided with a plurality of adjustment electrodes, and two adjacent of the plurality of adjustment electrodes are insulated from each other and located at intervals.

In one embodiment, the plurality of adjustment electrodes extend along a direction substantially parallel to or perpendicular to the first electrode layer.

In one embodiment, each of the plurality of dimming units further comprises a second electrode layer located on the first wall, and the second electrode layer allows the light to pass through.

In one embodiment, the light-concentrating device further comprises a controller connected to the adjustment electrode and the first electrode layer and configured to apply a voltage between the adjustment electrode and the first electrode layer.

In one embodiment, the house comprises a cofferdam, a light-transmissive layer located on an end of the cofferdam, and an insulating layer located on the other end of the cofferdam, a side of the cofferdam being provided with the adjustment electrode, and the common electrode layer being located on the insulating layer.

In one embodiment, an affinity between the insulating layer and the second light-transmissive liquid is greater than an affinity between the insulating layer and the first light-transmissive liquid; or the insulating layer is provided with an affinity layer having a light-transmissive property, and an affinity between the affinity layer and the second light-transmissive liquid is greater than an affinity between the affinity layer and the first light-transmissive liquid.

In one embodiment, light-transmissive layers of the plurality of dimming units are integrated.

In one embodiment, insulating layers of the plurality of dimming units are integrated.

In one embodiment, four sides of the house are provided with adjustment electrodes, respectively, and two adjacent adjustment electrodes thereof are insulated and located at intervals.

In one embodiment, each side of the house is provided with a plurality of adjustment electrodes, and two adjacent adjustment electrodes thereof are insulated and located at intervals.

In one embodiment, the light-concentrating plate further comprises a light-transmissive substrate, and the common electrode layer of each of the plurality of dimming units is located on the light-transmissive substrate.

In one embodiment, a light-concentrating display screen is provided. The light-concentrating display screen comprises a transparent display panel, a reflective layer located on the transparent display panel and comprising a light-transmissive structure, and a light-concentrating device comprising a light-concentrating plate located on the transparent display panel. The light-concentrating plate comprises a plurality of dimming units arranged in an array, and each of the plurality of dimming units comprises: a house, wherein the house comprises a first wall, a second wall opposite to the first wall, and a side wall connected to both the first wall and the second wall; and the house allows light to pass through at least from the first wall to the second wall; a first light-transmissive liquid filled in the house, wherein the first light-transmissive liquid is a conductive liquid; a first electrode layer located on the second wall, wherein the first electrode layer allows the light to pass through; and an adjustment electrode located on the side wall of the house, wherein the adjustment electrode is insulated from the first electrode layer.

In one embodiment, the first wall is a light-transmissive layer, the second wall is an insulating layer, and the first electrode layer is located on a side of the insulating layer facing away from the first wall; and the plurality of dimming units share a common light-transmissive layer, a common insulating layer, and a common first electrode layer.

In one embodiment, each of the plurality of dimming units further comprises a second light-transmissive liquid filled in the house, wherein the second light-transmissive liquid is a non-conductive liquid, and the first light-transmissive liquid and the second light-transmissive liquid are insoluble with each other; a first affinity between the second wall and the second light-transmissive liquid is different from a second affinity between the second wall and the first light-transmissive liquid.

In one embodiment, the house comprises four side walls, and each of the four side walls are provided with a plurality of adjustment electrodes, and two adjacent of the plurality of adjustment electrodes are insulated from each other and located at intervals.

In one embodiment, the plurality of adjustment electrodes extend along a direction substantially parallel to or perpendicular to the first electrode layer.

In one embodiment, each of the plurality of dimming units further comprises a second electrode layer located on the first wall, and the second electrode layer allows the light to pass through.

In one embodiment, the light-concentrating device further comprises a controller connected to the adjustment electrode and the first electrode layer and configured to apply a voltage between the adjustment electrode and the first electrode layer.

In one embodiment, the transparent display panel comprises a liquid crystal plate and a LED backlight plate; the house is a color house and allows only one of red light, blue light, and green light to pass through, and colors of three adjacent houses are arranged in an RGB manner.

In one embodiment, the light-transmissive structure comprises a plurality of switch units, and each of the switch units comprises: a dam; a light-transmissive electrode layer located on an end of the dam; an insulating transparent layer located on the other end of the dam; and a light-transmissive conductive layer located on the insulating transparent layer, wherein the dam, the light-transmissive electrode layer and the insulating transparent layer cooperatively form a sealed chamber; and a light-transmissive conductive liquid and a light-reflective liquid filled in the sealed chamber, wherein the light-transmissive conductive liquid and the light-reflective liquid are insoluble with each other, the light-reflective liquid is a light-reflective and non-conductive liquid, and an affinity between the insulating transparent layer and the light-reflective liquid is greater than an affinity between the insulating transparent layer and the light-transmissive conductive liquid.

In one embodiment, the transparent display panel comprises an OLED layer or a Micro LED layer.

In one embodiment, the light-concentrating plate is provided on a front surface of the transparent display panel; or the light-concentrating plate is located between the transparent display panel and the reflective layer.

In one embodiment, the transparent display panel comprises a liquid crystal plate and an LED backlight plate located on a back face of the liquid crystal plate.

In one embodiment, the light-concentrating plate is located on a front surface of the liquid crystal plate; or the light-concentrating plate is located between the LED backlight plate and the reflective layer.

In one embodiment, the light-concentrating plate is located on the front surface of the liquid crystal plate, and each house is a color house that transmits one of red light, blue light, and green light, colors of three adjacent houses thereof being arranged in an RGB manner; or, the front surface of the liquid crystal plate being provided with a color filter layer.

In one embodiment, at least one end of the house exhibits red light, blue light or green light; or/and, the first light-transmissive liquid exhibits red light, blue light or green light; or/and, the second light-transmissive liquid exhibits red light, blue light or green light.

In one embodiment, the light-transmissive structure comprises a light-transmissive hole defined by the reflective layer.

In one embodiment, the light-transmissive structure comprises a switch plate, the switch plate comprises a plurality of switch units, each of the switch units comprises a dam, a light-transmissive electrode layer located on an end of the dam, an insulating transparent layer located on the other end of the dam, and a light-transmissive conductive layer located on the insulating transparent layer, the light-transmissive conductive layer is located on a side of the insulating transparent layer facing away from the light-transmissive electrode layer, the dam, the light-transmissive electrode layer and the insulating transparent layer cooperatively form a sealed chamber, the sealed chamber is filled with a light-transmissive conductive liquid and a light-reflective liquid insoluble with each other, the light-reflective liquid is a light-reflective and non-conductive liquid, an affinity between the insulating transparent layer and the light-reflective liquid is greater than an affinity between the insulating transparent layer and the light-transmissive conductive liquid.

In one embodiment, the light-reflective layer defines a through hole, the switch plate is located in the through hole; or, the reflective layer is functioned as the switch plate, and the plurality of switch units of the reflective layer constituting the light-transmissive structure.

In one embodiment, an electric product is provided. The electric product comprises a camera module and a light-concentrating display screen. The light-concentrating display screen comprises a transparent display panel, a reflective layer located on the transparent display panel and comprising a light-transmissive structure, and a light-concentrating device comprising a light-concentrating plate located on the transparent display panel; the camera module being located on a corresponding position of the light-transmissive structure. The light-concentrating plate comprises a plurality of dimming units arranged in an array, and each of the plurality of dimming units comprises: a house, wherein the house comprises a first wall, a second wall opposite to the first wall, and a side wall connected to both the first wall and the second wall; and the house allows light to pass through at least from the first wall to the second wall; a first light-transmissive liquid filled in the house, wherein the first light-transmissive liquid is a conductive liquid; a first electrode layer located on the second wall, wherein the first electrode layer allows the light to pass through; and an adjustment electrode located on the side wall of the house, wherein the adjustment electrode is insulated from the first electrode layer.

In one embodiment, the first wall is a light-transmissive layer, the second wall is an insulating layer, and the first electrode layer is located on a side of the insulating layer facing away from the first wall; and the plurality of dimming units share a common light-transmissive layer, a common insulating layer, and a common first electrode lay.

In one embodiment, the house comprises four side walls, and each of the four side walls are provided with a plurality of adjustment electrodes, and two adjacent of the plurality of adjustment electrodes are insulated from each other and located at intervals.

In one embodiment, each of the plurality of dimming units further comprises a second light-transmissive liquid filled in the house, wherein the second light-transmissive liquid is a non-conductive liquid, and the first light-transmissive liquid and the second light-transmissive liquid are insoluble with each other.

The above one or more technical solutions in the embodiment of the present disclosure have at least one of the following technical effects:

The light-concentrating plate according to the embodiments of the present disclosure is provided with a plurality of dimming units. Two ends of the house of each of the dimming units transmit light, and the house is filled with insoluble first light-transmissive liquid and second light-transmissive liquid. Then, light may be refracted when passing through the interface between the first light-transmissive liquid and the second light-transmissive liquid. Adjustment electrodes are provided on sides of the house, and a common electrode layer is provided at an end of the house. The voltages may be applied between the common electrode layer and the adjustment electrodes on the sides of the house, so that the first light-transmissive liquid and the second light-transmissive liquid can be to deflected and inclined in the house, thereby deflecting the light transmitted through the house. By changing the voltages between the adjustment electrodes on the sides of the house and the common electrode layer, the deflection angle of the light can be changed, and thereby to achieve light concentration via cooperation between the plurality of dimming units.

The light-concentrating display screen according to the embodiment of the present disclosure uses the above-mentioned light-concentrating plate, which can not only realize image displaying but also perform light concentration.

The mobile terminal according to the embodiments of the present disclosure, by including the above-mentioned light-concentrating display screen, can have no opening or through hole on the screen and increase a screen ratio. Moreover, the light-concentrating display screen can be directly used for light concentrating and focusing, and the camera module can obtain more light, thereby improving the shooting quality.

Figure 2:
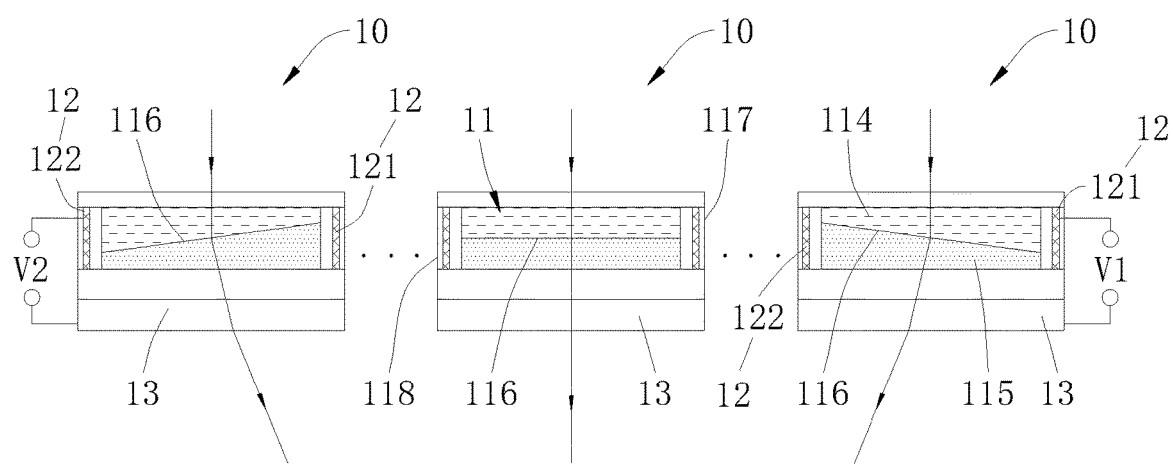
FIG. 2 is a structural diagram showing that a plurality of dimming units cooperates to adjust light in the light-concentrating plate of FIG. 1.
Figure 3:
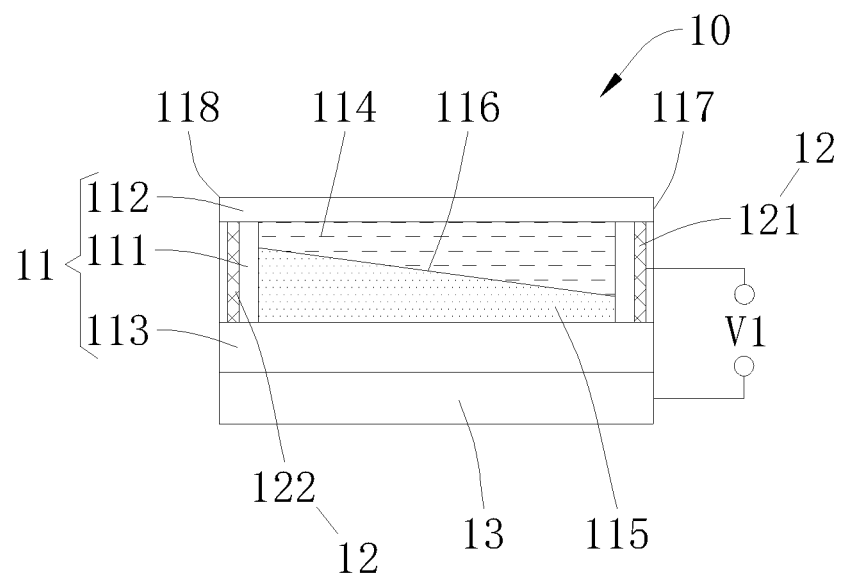
FIG. 3 is a structural diagram showing that a single dimming unit adjusts light in the light-concentrating plate of FIG. 1.

Referring FIGS. 1 to 3, a light-concentrating device 600 provided by the present disclosure will be hereby described. The light-concentrating device 600 includes a light-concentrating plate 100 and a controller 60 electrically connected to the light-concentrating plate 100. The light-concentrating plate 100 includes a plurality of dimming units 10 arranged in an array. Each of the dimming units 10 constitutes a light-concentrating pixel point of the light-concentrating plate 100, and the structure is convenient for arrangement.

Each of the dimming units 10 includes a house 11 of which at least two ends transmit light. Light may pass through the house 11, that is, light may enter from one end of the house 11 and be get out of the house 11 from the other end. The house 11 is filled with a first light-transmissive liquid 114 and a second light-transmissive liquid 115. The first light-transmissive liquid 114 and the second light-transmissive liquid 115 are insoluble with each other, namely, the first light-transmissive liquid 114 is insoluble in the second light-transmissive liquid 115, and the second light-transmissive liquid 115 is also insoluble in the first light-transmissive liquid 114, so that an interface 116 is formed between the first light-transmissive liquid 114 and the second light-transmissive liquid 115. The first light-transmissive liquid 114 is a conductive liquid, and the second light-transmissive liquid 115 is a non-conductive liquid. The first light-transmissive liquid 114 is located at one end of the house 11 and the second light-transmissive liquid 115 is located at the other end of the house 11, so that the light may be refracted when passing through the interface 116 between the light-transmissive liquid 114 and the second light-transmissive liquid 115. An end of the house 11 adjacent to the second light-transmissive liquid 115 is provided with a common electrode layer 13, and sides of the house 11 are provided with adjustment electrodes 12. Each of the adjustment electrodes 12 is located to be insulated from the common electrode layer 13 which is a light-transmissive layer.

The controller 60 can be a micro processor and electrically connected to the adjustment electrodes 12 and the common electrode layer 13 and configured to apply a voltage between the adjustment electrodes 12 and the common electrode layer 13. In one embodiment, the controller 60 is configured to apply a voltage between each of the adjustment electrodes 12 and the common electrode layer 13. The voltage between one of the adjustment electrodes 12 and the common electrode layer 13 can be same or different from the voltage between another one of the adjustment electrodes 12 and the common electrode layer 13.

Referring FIGS. 2 and 3, for convenience of description, two sides of the house 11 are defined as a first side 117 and a second side 118. In one embodiment, the two sides of the house 11 are each provided with an adjustment electrode 12, and the adjustment electrodes 12 on the two sides of the house 11 are defined as a first electrode 121 and a second electrode 122. Voltages are applied to the adjustment electrodes 12 on the two sides of the house 11. The voltages applied to the adjustment electrodes 12 are voltages relative to the common electrode layer 13, that is, a voltage V1 is applied between the first electrode 121 and the common electrode layer 13, and a voltage V2 is applied between the second electrode 122 and the common electrode layer 13.

When V1=V2=0, the interface 116 between the first light-transmissive liquid 114 and the second light-transmissive liquid 115 is planar.

When V1=V2, and both V1 and V2 are greater than zero, since the first light-transmissive liquid 114 is a conductive liquid, the first light-transmissive liquid 114 will converge toward each of the adjustment electrodes 12, that is, the first light-transmissive liquid 114 will converge toward the first electrode 121 and the second electrode 122, the interface 116 is formed between the first light-transmissive liquid 114 and the second light-transmissive liquid 115, the interface 116 is a curved surface with a center portion protruding in a direction away from the common electrode layer 13, and a position of the interface 116 closer to the adjustment electrodes 12 is more inclined toward a direction adjacent to the common electrode layer 13, so that the light passing through the interface 116 are deflected.

When V1>V2, since the first light-transmissive liquid 114 is a conductive liquid, the first light-transmissive liquid 114 will converge toward the adjustment electrodes 12, and the interface 116 is formed between the first light-transmissive liquid 114 and the second light-transmissive liquid 115, the interface 116 is a curved surface with a center portion protruding in a direction away from the common electrode layer 13, and a position of the interface 116 closer to the adjustment electrodes 12 is more inclined toward a direction adjacent to the common electrode layer 13. Moreover, intensity of an electric field at the first electrode 121 will be greater than that at the second electrode 122, and then the first side 117 of the house 11 will gather more first light-transmissive liquid 114 than the second side 118 of the house 11, so that a distance between a position of the interface 116 adjacent to the first side 117 of the house 11 and the common electrode layer 13 will be smaller than a distance between a position of the interface 116 adjacent to the second side 118 of the house 11 and the common electrode layer 13, thereby also making the light passing through the interface 116 be deflected.

When the voltage V1 is applied between only the adjustment electrode 12 on a single side of the house 11 and the common electrode layer 13, i.e., when the voltage V1 is applied between only the first electrode 121 and the common electrode layer 13, the first light-transmissive liquid 114 will converge toward a side of the first electrode 121, so that the interface 116 formed between the first light-transmissive liquid 114 and the second light-transmissive liquid 115 is inclined. Moreover, a distance between a side of the interface 116 adjacent to the first electrode 121 and the common electrode layer 13 is smaller than a distance between the other side of the interface 116 away from the first electrode 121 and the common electrode layer 13, so that the light passing through the interface 116 are deflected. Furthermore, as V1 increases, the inclination of the interface 116 relative to the common electrode layer 13 will increase, thereby adjusting a deflection angle of the light passing through the house 11.

When the voltage V2 is applied between only the adjustment electrode 12 on the other single side of the house 11 and the common electrode layer 13, i.e., when the voltage V2 is applied between only the second electrode 122 and the common electrode layer 13, the first light-transmissive liquid 114 will converge toward a side of the second electrode 122, so that the interface 116 formed between the first light-transmissive liquid 114 and the second light-transmissive liquid 115 is inclined. Moreover, a distance between a side of the interface 116 adjacent to the second electrode 122 and the common electrode layer 13 is smaller than a distance between the other side of the interface 116 away from the second electrode 122 and the common electrode layer 13, so that the light passing through the interface 116 are deflected. Furthermore, as V2 increases, the inclination of the interface 116 relative to the common electrode layer 13 will increase, thereby adjusting a deflection angle of the light passing through the house 11.

The two cases of applying the voltage V1 between the first electrode 121 and the common electrode layer 13 and applying the voltage V2 between the second electrode 122 and the common electrode layer 13 may cause the light at the interface 116 to be deflected in different directions. When the first electrode 121 and the second electrode 122 are located on two opposite sides of the house 11, the light at the interface 116 will be deflected in opposite directions. Therefore, when different combined voltages are applied between the adjustment electrodes 12 of the dimming units 10 and the common electrode layer 13, the deflection of the light passing through the dimming units 10 can be controlled. Furthermore, when different combined voltages are applied between the adjustment electrodes 12 of the plurality of dimming units 10 and the common electrode layer 13, the light passing through the dimming units 10 can be converged. Furthermore, by adjusting magnitudes of the voltages applied to each of the dimming units 10, the focusing of the light can be achieved.

In one embodiment, the house 11 can be filled only with the first light-transmissive liquid 114, and the second light-transmissive liquid 115 can be replaced by gas such as air. The interface 116 can be the interface between the first light-transmissive liquid 114 and air.

Of course, in some embodiments, the adjustment electrodes 12 may also be provided on only one side of the house 11. During manufacturing, a position light-concentrating center of the light-concentrating plate 100 is first determined, and the adjustment electrodes 12 of all the houses 11 equidistant from the light-concentrating center are located on a side of the corresponding house 11 adjacent to the light-concentrating center, whereby the converging of light may also be achieved.

The light-concentrating plate 100 according to the embodiments of the present disclosure is provided with a plurality of dimming units 10. Two ends of the house 11 of each of the dimming units 10 transmit light, and the house 11 is filled with insoluble first light-transmissive liquid 114 and second light-transmissive liquid 115. Then, light may be refracted when passing through the interface 116 between the first light-transmissive liquid 114 and the second light-transmissive liquid 115. Adjustment electrodes 12 are provided on sides of the house 11, and a common electrode layer 13 is provided at an end of the house 11. The voltages may be applied between the common electrode layer 13 and the adjustment electrodes 12 on the sides of the house 11, so that the first light-transmissive liquid 114 and the second light-transmissive liquid 115 can be to deflected and inclined in the house 11, thereby deflecting the light transmitted through the house 11. By changing the voltages between the adjustment electrodes 12 on the sides of the house 11 and the common electrode layer 13, the deflection angle of the light can be changed, and thereby to achieve light concentration via cooperation between the plurality of dimming units 10.

In one embodiment, the house 11 includes a cofferdam 111, a light-transmissive layer 112, and an insulating layer 113. The light-transmissive layer 112 is located an end of the cofferdam 111, and the insulating layer 113 is located at the other end of the cofferdam 111. That is, the cofferdam 111, the light-transmissive layer 112, and the insulating layer 113 cooperatively form the house 11, so as to facilitate processing and manufacturing. The adjustment electrodes 12 are provided on sides of the cofferdam 111, and are supported via the cofferdam 111. The common electrode layer 13 is provided on the insulating layer 113, and is supported via the insulating layer 113.

In one embodiment, referring to FIG. 1, the light-transmissive layers 112 of the plurality of dimming units 10 are integrated, that is, a whole light-transmissive sheet is directly divided into plurality of regions each serving as the light-transmissive layers 112 of the dimming units 10, so that to facilitate processing and manufacturing. Of course, in some embodiments, the light-transmissive layers 112 may be provided independently. The plurality of dimming units 10 may be adhesively connected, or the plurality of dimming units 10 may be fabricated on a transparent support plate or cover plate. In some embodiments, the light-transmissive layers 112 may also be disposed on a single plate, so as to facilitate connection of the plurality of dimming units 10 and to facilitate manufacturing.

In one embodiment, the cofferdam 111 is made of a light-transmissive material, so that light may enter the house 11 through the cofferdam 111, and will be refracted to converge, when passing the interface 116 between the first light-transmissive liquid 114 and the second light-transmissive liquid 115. This solution may achieve the effect of gathering more light to implement lighting. Of course, in some embodiments, the cofferdam 111 may also be opaque, and as such, only two ends of each house 11 are light-transmissive.

In one embodiment, referring to FIG. 1, the insulating layers 113 of the plurality of dimming units 10 are integrated, that is, a whole insulating sheet is directly divided into a plurality of regions each serving as the insulating layers 113 of the dimming units 10 to facilitate processing and manufacturing. Of course, in some embodiments, the insulating layers 113 may be provided independently; and the plurality of dimming units 10 may be adhesively connected, or the plurality of dimming units 10 may be fabricated on a transparent support plate or cover plate. In some embodiments, the insulating layers 113 may also be provided on a plate, so as to facilitate connection of the plurality of dimming units 10 and to facilitate manufacturing.

In one embodiment, referring FIGS. 2 and 3, the affinity between the insulating layer 113 and the second light-transmissive liquid 115 is greater than the affinity between the insulating layer 113 and the first light-transmissive liquid 114, so that the second light-transmissive liquid 115 may adhere to the insulating layer 113. Thus, the first light-transmissive liquid 114 and the second light-transmissive liquid 115 are located at two opposite ends of the house 11, thereby facilitating positioning the second light-transmissive liquid 115.

In some embodiments, an affinity layer having a light-transmissive property may also be provided on the insulating layer 113, and the affinity between the affinity layer and the second light-transmissive liquid 115 is greater than the affinity between the affinity layer and the first light-transmissive liquid 114.

In one embodiment, each house 11 is a color house 11, so that the house 11 can selectively transmits light of a corresponding color. For example, when the house 11 is red, the house 11 may transmit red light; when the house 11 is green, the house 11 may transmit green light, and the like. By providing the house 11 with a color, the filtering of light can be achieved, namely, the light can be filtered by the dimming units 10.

In one embodiment, the first light-transmissive liquid 114 filled in the house 11 may be a color liquid having a single color, so that the house 11 as a whole exhibits a corresponding color. Of course, if the house 11 is required to exhibit a color, the first light-transmissive liquid 114 therein may be configured to be a liquid having the required color.

In one embodiment, the second light-transmissive liquid 115 filled in the house 11 may be a color liquid having a single color, so that the house 11 as a whole exhibits a corresponding color. Of course, if the house 11 is required to exhibit a color, the second light-transmissive liquid 115 therein may be configured to be a liquid having the required color.

In one embodiment, both the first light-transmissive liquid 114 and the second light-transmissive liquid 115 in the house 11 may be configured to be colored liquids having the same color, so that the house 11 as a whole exhibits a corresponding color. Of course, if the house 11 is required to exhibit a color, both the first light-transmissive liquid 114 and the second light-transmissive liquid 115 therein may be configured to be liquids having the required same color.

Of course, in one embodiment, if the house 11 is required to exhibit a color, an end of the house 11 may be configured as a light-transmissive surface having the required color, or the other end of the house 11 may be configured as a light-transmissive surface having the required color. In one embodiment, both two opposite ends of the house 11 may be configured as light-transmissive surfaces having the required color.

Of course, in one embodiment, if the house 11 is required to exhibit a color, one or more than one of the two ends of the house 11, the first light-transmissive liquid 114 and the second light-transmissive liquid 115 may be configured to have the required color.

In some embodiments, the color of each house 11 is one of red light, blue light, and green light. For example, at least one end of the house 11 exhibits red light, blue light, or green light; and/or the first light-transmissive liquid 114 exhibits red light, blue light or green light; and/or the second light-transmissive liquid 115 exhibits red light, blue light or green light. Colors of three adjacent houses 11 thereof are arranged in RGB, where R is Red, G is Green, and B is Blue. Accordingly, the light-concentrating plate 100 may be configured to function as a color filter (CF).

In one embodiment, the second light-transmissive liquid 115 may be non-conductive ink with low costs. Of course, the second light-transmissive liquid 115 may also be other light-transmissive liquid.

In one embodiment, when the second light-transmissive liquid 115 is ink, the insulating layer 113 may be an insulating transparent layer. For example, the insulating transparent layer may be a lipophilic insulating layer such as plastic or resin. The plastic may be polytetrafluoroethylene, and of course, may also be other plastic.

In one embodiment, the first light-transmissive liquid 114 may be a light-transmissive and conductive liquid such as an aqueous solution or an acetic acid solution.

In one embodiment, the light-transmissive layer 112 may be a glass layer, a transparent plastic layer, a transparent resin layer, or the like.

In one embodiment, the common electrode layer 13 may be an ITO layer. Of course, the common electrode layer 13 may also be other transparent and conductive electrode layer, such as a ZnO-based transparent conductive film, a multi-component transparent conductive film, a high-mobility transparent conductive film, or the like.

In one embodiment, the cofferdam 111 may be made of epoxy resin, plastic, or the like and formed on the insulating transparent layer.

Figure 4:
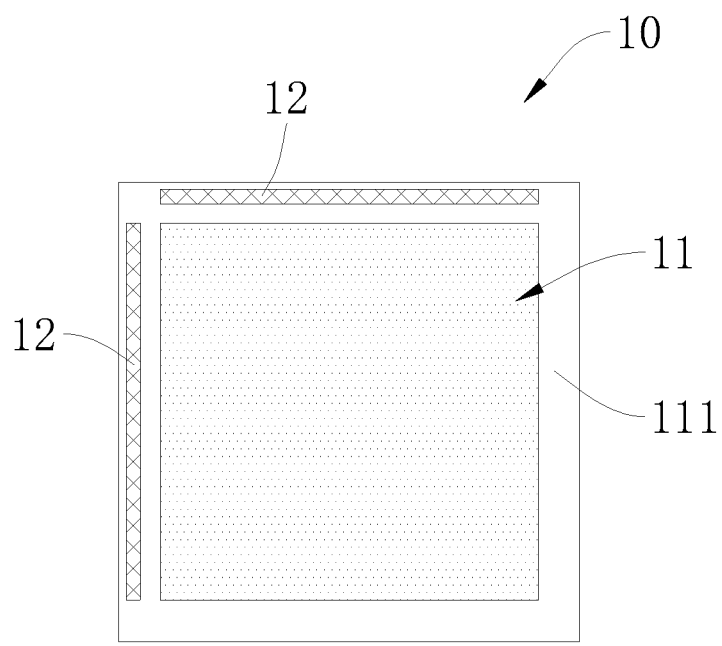
FIG. 4 is a structural diagram of a top view of dimming units in a light-concentrating plate according to one embodiment of the present disclosure.

In one embodiment, referring to FIG. 4, one adjustment electrode 12 is provided on one side of the house 11 and the other one adjustment electrode 12 is provided on the other one side of the house 11 adjacent to the one side of the house 11, so that a voltage is independently applied between one of the adjustment electrodes 12 and a common electrode layer 13 to adjust light passing through the house 11 to be deflected toward a side of the house 11. When voltages are applied concurrently between the two adjacent adjustment electrodes 12 and the common electrode layer 13, the first light-transmissive liquid 114 will converge toward the two adjustment electrodes 12; and intensity of an electric field adjacent to the two adjustment electrodes 12 is greater, and there will be more first light-transmissive liquid 114 concentrated at position adjacent to the adjustment electrodes 12. Thus, an interface 116 formed between the first light-transmissive liquid 114 and the second light-transmissive liquid 115 will be inclined along a diagonal line of the house 11, and the diagonal line is a diagonal line corresponding to one end of the each adjustment electrode 12 away from the other adjustment electrode 12; and a distance between a corner of the interface 116 adjacent to the two adjustment electrodes 12 and the common electrode layer 13 is smaller than a distance between another opposite corner of the interface 116 and the common electrode layer 13. This structure may make it easier to adjust the interface 116 between the first light-transmissive liquid 114 and the second light-transmissive liquid 115 in the house 11, thereby adjusting the deflection direction and angle of the light passing through the dimming units 10.

Figure 5:
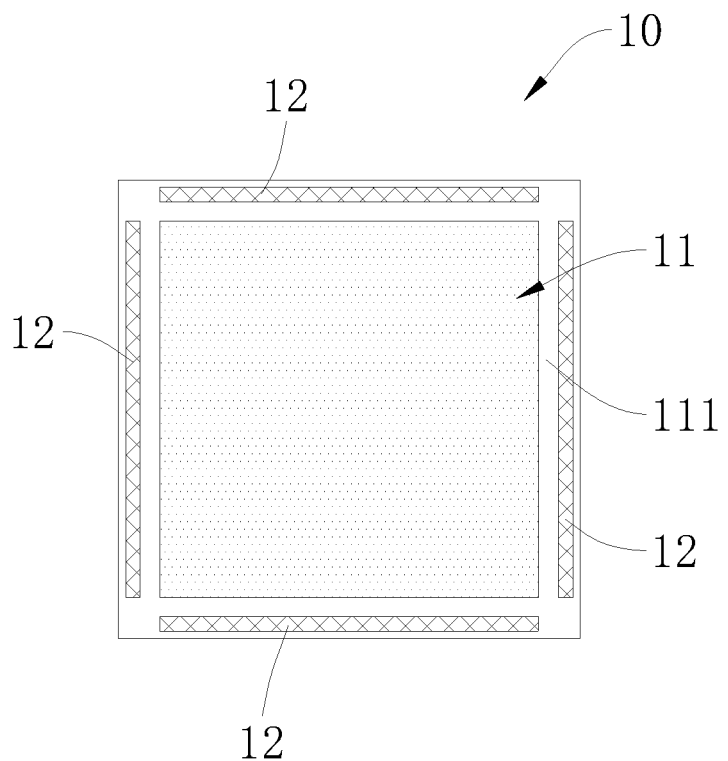
FIG. 5 is a structural diagram of a top view of dimming units in a light-concentrating plate according to one embodiment of the present disclosure.

In one embodiment, referring to FIG. 5, each of four sides of the house 11 is provided with an adjustment electrode 12, and two adjacent adjustment electrodes 12 thereof are configured to be insulated and located at intervals. This structure may make it easier to control the shape and inclination angle of the interface 116 between the first light-transmissive liquid 114 and the second light-transmissive liquid 115, thereby facilitating controlling the deflection direction and angle of the light passing the dimming units 10. In addition, in this structure, the dimming units 10 may have a same structure on each of the sides, which facilitates arrangement and processing and manufacturing.

Figure 6:
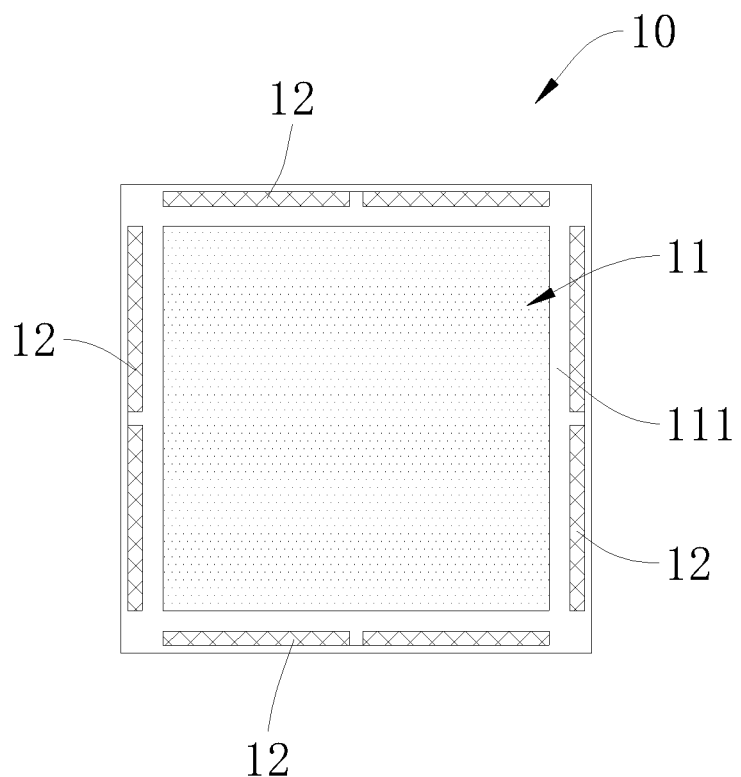
FIG. 6 is a structural diagram of a top view of dimming units in a light-concentrating plate according to one embodiment of the present disclosure.
Figure 7A:
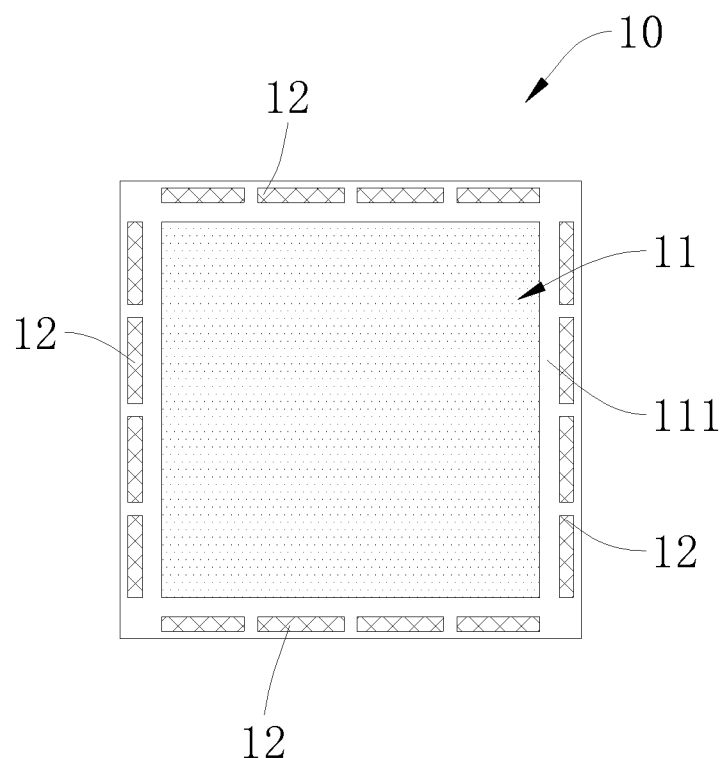
FIG. 7A is a cross-sectional structural diagram of dimming units in a light-concentrating plate according to one embodiment of the present disclosure.
Figure 7B:
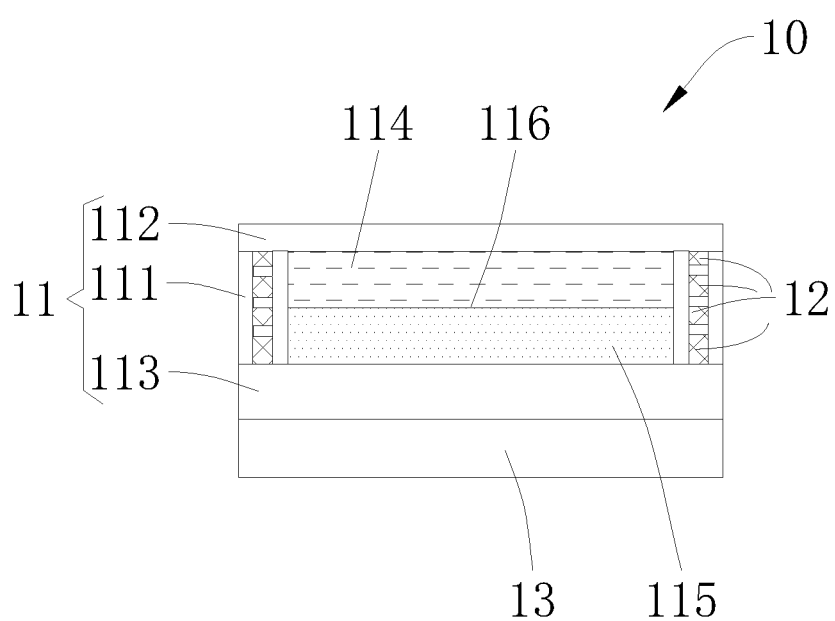
FIG. 7B is a cross-sectional structural diagram of dimming units in a light-concentrating plate according to one embodiment of the present disclosure.

In one embodiment, referring to FIG. 6, a plurality of adjustment electrodes 12 are provided on each side of the house 11, and two adjacent adjustment electrodes 12 thereof are configured to be insulated and located at intervals. By providing the plurality of adjustment electrodes 12 on each side of the house 11, the shape of the interface 116 between the first light-transmissive liquid 114 and the second light-transmissive liquid 115 can be further controlled, which facilitates control of the deflection directions and angles of the light passing through each of the dimming units, thereby achieving focusing. In one embodiment, two adjustment electrodes 12 are provided on each side of the house 11. In some embodiments, referring to FIG. 7A, four adjustment electrodes 12 may also be provided on each side of the house 11 and extend along a direction substantially perpendicular to the common electrode layer 13. FIG. 7B, four adjustment electrodes 12 may also be provided on each side of the house 11 and extend along a direction substantially parallel to the common electrode layer 13. The four adjustment electrodes 12 may have same width as shown in FIG. 7A or different widths as shown in FIG. 7B. In some other embodiments, a number of adjustment electrodes 12, for example, three or five, may also be provided on each side of the house 11. Of course, in one embodiment, referring to FIG. 5, only one adjustment electrode 12 may also be provided on each side of the house 11 to facilitate processing and manufacturing.

Figure 8:
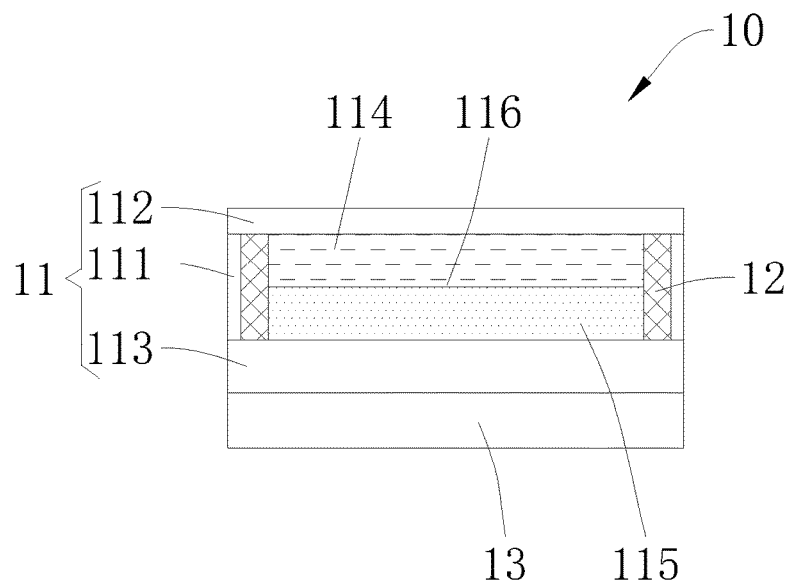
FIG. 8 is a cross-sectional structural diagram of a light-concentrating plate according to one embodiment of the present disclosure.
Figure 9A:
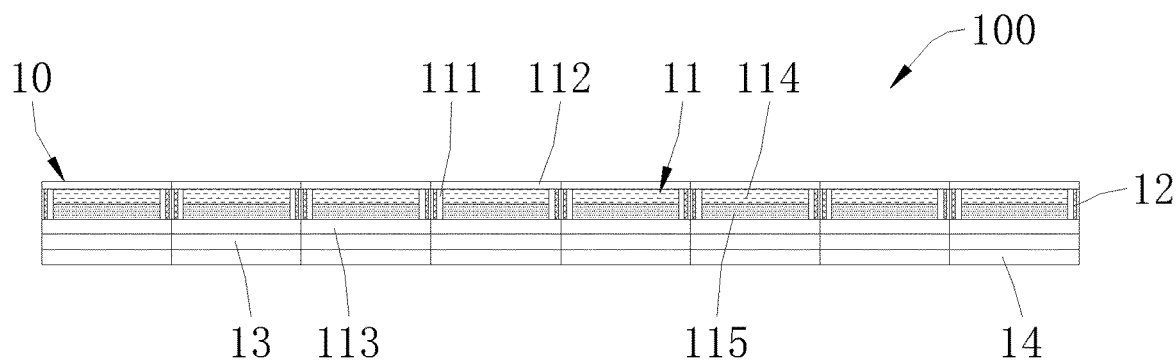
FIG. 9A is a cross-sectional structural diagram of a light-concentrating plate according to one embodiment of the present disclosure.

In one embodiment, referring to FIG. 8, adjustment electrodes 12 on sides of the house 11 can be located on an inner side surfaces of the house 11 and exposed to the first light-transmissive liquid 114 and the second light-transmissive liquid 115, so that when voltages are applied between the adjustment electrodes 12 and the common electrode layer 13, the first light-transmissive liquid 114 can be converged toward the adjustment electrodes 12. In one embodiment, the adjustment electrodes 12 can be buried under the inner side surfaces of the house 11, i.e., make the adjustment electrodes 12 not in direct contact with the first light-transmissive liquid 114 and the second light-transmissive liquid 115 as shown in FIG. 3. In one embodiment, referring to FIG. 9A, the light-concentrating plate 100 further includes a light-transmissive substrate 14. The common electrode layer 13 of each dimming unit 10 is located on the light-transmissive substrate 14. At the time of making the structure, the common electrode layer 13 is formed on the light-transmissive substrate 14 first, then the insulating layer 113 is formed on the common electrode layer 13, then the cofferdam 111 with adjustment electrodes 12 is formed, and then the light-transmissive layer 112 is located on the insulating layer 113, which facilitates making process as well as facilitates the plurality of dimming units 10 cooperatively to form an integrated plate-like structure. Of course, in some embodiments, each dimming unit 10 may also be manufactured separately, and then fixed on the light-transmissive substrate 14.

Figure 9B:
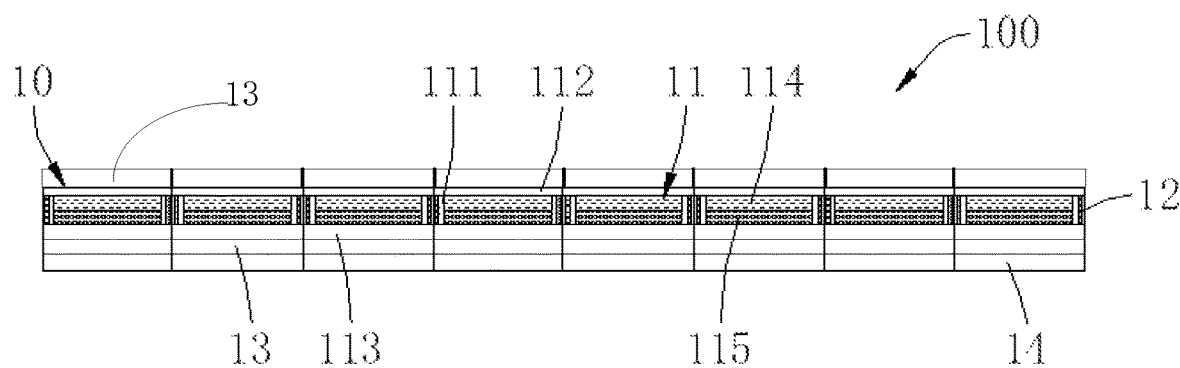
FIG. 9B is a cross-sectional structural diagram of a light-concentrating plate according to one embodiment of the present disclosure.

In one embodiment, referring to FIG. 9B, each of the plurality of dimming units 10 can include two common electrode layers 13. One of the two common electrode layers 13 is located on the insulating layer 113 and the other one of the two common electrode layers 13 is located on the light-transmissive layer 112. Both two common electrode layers 13 are insulated from the adjustment electrodes 12.

In one embodiment, the light-transmissive substrate 14 may be a glass layer, a transparent plastic layer, a transparent resin layer, or the like.

The light-concentrating plate 100 according to the embodiments of the present disclosure may adjust the deflection direction and angle of the transmitted light, thereby can concentrate the light as well as achieve focusing. When used in cooperation with an image sensor, the light-concentrating plate may achieve light extraction with larger areas and angles and acquisition of more light, thereby improving the imaging quality.

Figure 10:
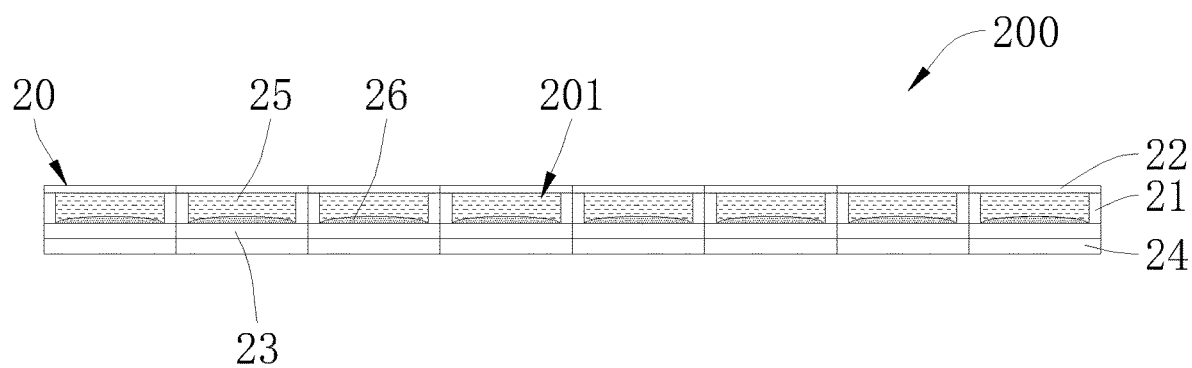
FIG. 10 is a cross-sectional structural diagram of a switch plate according to an embodiment of the present disclosure.
Figure 11:
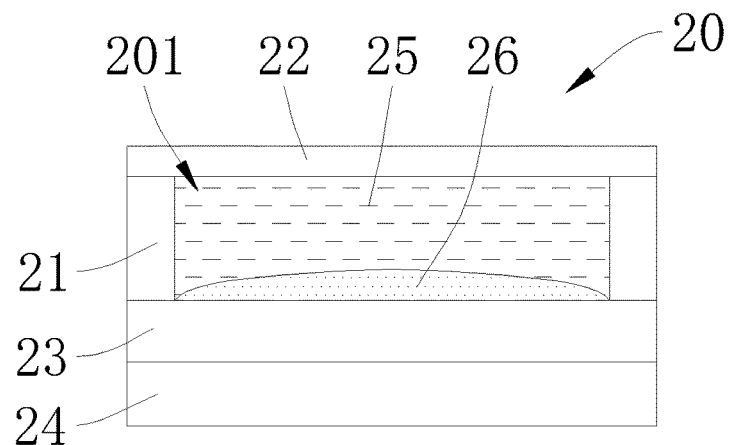
FIG. 11 is a cross-sectional structural diagram I of the switch unit of FIG. 10, in which no voltage is applied between a light-transmissive electrode layer and a light-transmissive conductive layer.
Figure 12:
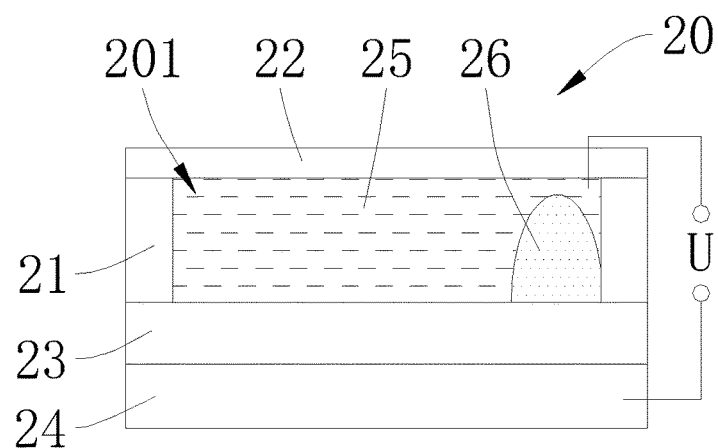
FIG. 12 is a cross-sectional structural diagram II of the switch unit of FIG. 11, in which a voltage is applied between the light-transmissive electrode layer and the light-transmissive conductive layer.

Referring FIGS. 10 to 12, embodiments of the present disclosure further provide a switch plate 200. The switch plate 200 includes a plurality of switch units 20 arranged in an array to facilitate arrangement. Each of the switch units 20 includes a dam 21, a light-transmissive electrode layer 22, an insulating transparent layer 23, and a light-transmissive conductive layer 24. The light-transmissive electrode layer 22 covers an end of the dam 21, and the insulating transparent layer 23 is provided at the other end of the dam 21. The light-transmissive conductive layer 24 is located on a side of the insulating transparent layer 23 facing away from the light-transmissive electrode layer 22. The dam 21, the light-transmissive electrode layer 22, and the insulating transparent layer 23 cooperatively form a sealed chamber 201 filled with a light-transmissive conductive liquid 25 and a light-reflective liquid 26. The light-transmissive conductive liquid 25 and the light-reflective liquid 26 are insoluble with each other. That is, the light-transmissive conductive liquid 25 is insoluble in the light-reflective liquid 26, and the light-reflective liquid 26 is also insoluble in the light-transmissive conductive liquid 25, so that an interface 116 is formed between the light-transmissive conductive liquid 25 and the light-reflective liquid 26. The light-transmissive conductive liquid 25 is a conductive liquid, and the light-reflective liquid 26 is a light-reflective and non-conductive liquid, so that light will be reflected when passing through the interface 116 between the light-transmissive conductive liquid 25 and the light-reflective liquid 26. Affinity between the insulating transparent layer 23 and the light-reflective liquid 26 is greater than affinity between the insulating transparent layer 23 and the light-transmissive conductive liquid 25.

Referring FIGS. 11 and 12, when no voltage is applied between the light-transmissive electrode layer 22 and the light-transmissive conductive layer 24, since affinity between the insulating transparent layer 23 and the light-reflective liquid 26 is greater than affinity between the insulating transparent layer 23 and the light-transmissive conductive liquid 25, the light-reflective liquid 26 will be located on and cover entire the insulating transparent layer 23. Thus, when irradiating on the light-reflective liquid 26, light will undergo reflection to form a light-reflective structure, thus the switch units 20 are in an off state. When the switch units 20 on the switch plate 200 are in the off state, the switch plate 200 is configured to form a light-reflective plate.

Referring FIGS. 11 and 12, when a voltage U is applied between the light-transmissive electrode layer 22 and the light-transmissive conductive layer 24, since the light-transmissive electrode layer 22 is located one end of the other end of the sealed house 11, an electric field will be formed in the sealed house 11. Due to the electrowetting effect, a contact angle of the light-reflective liquid 26 decreases and the light-reflective liquid 26 shrinks. Meanwhile, since the light-transmissive conductive liquid 25 is a conductive liquid and flows under the action of the electric field in the sealed house 11, the light-transmissive conductive liquid 25 will squeeze the light-reflective liquid 26 to move to sides of the sealed house 11, so that the light-reflective liquid 26 forms a small droplet. Thus, regions outside the light-reflective liquid 26 in the sealed house 11 may transmit light, and thus, the switch units 20 are light-transmissive and the switch units 20 are in an on state. When the switch units 20 in a region on the switch plate 200 are in an on state, a corresponding region of the switch plate 200 is configured to form a light-transmissive structure. When all the switch units 20 of the switch plate 200 are in an on state, the whole switch plate 200 forms a light-transmissive plate.

In one embodiment, the dam 21 may be made of epoxy resin, plastic, or the like and formed on the insulating transparent layer 23.

In one embodiment, the light-transmissive conductive layer 24 may be an ITO layer. Of course, the light-transmissive conductive layer 24 may also be other transparent and conductive electrode layer, such as a ZnO-based transparent conductive film, a multi-component transparent conductive film, a high-mobility transparent conductive film, or the like.

In one embodiment, the light-transmissive electrode layer 22 may be an ITO layer. Of course, the light-transmissive electrode layer 22 may also be other transparent and conductive electrode layer, such as a ZnO-based transparent conductive film, a multi-component transparent conductive film, a high-mobility transparent conductive film, or the like.

In one embodiment, the light-reflective liquid 26 may be non-conductive light-reflective ink with low costs. Of course, the light-reflective liquid 26 may also be other light-reflective liquid 26.

In one embodiment, when the light-reflective liquid 26 is ink, the insulating transparent layer 23 may be a lipophilic insulating layer. For example, the insulating transparent layer 23 may be a lipophilic insulating layer such as plastic or resin. The plastic may be polytetrafluoroethylene, and of course, may also be other plastic.

In one embodiment, the light-transmissive conductive liquid 25 may be a light-transmissive and conductive liquid such as an aqueous solution or an acetic acid solution.

Figure 13:
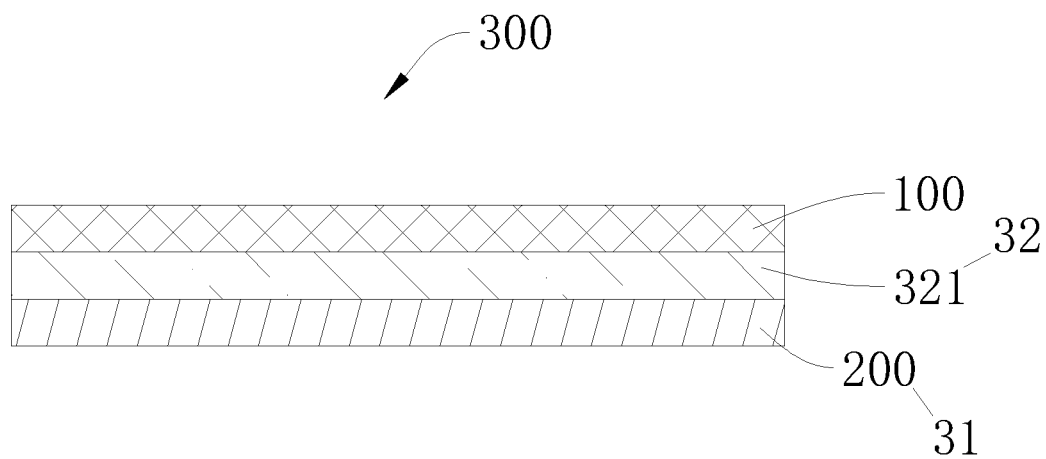
FIG. 13 is a structural diagram of a first type of light-concentrating display screen according to an embodiment of the present disclosure.

Referring to FIG. 13, an embodiment of the present disclosure further provides a light-concentrating display screen 300, which includes a transparent display panel 32, a reflective layer 31, and a light-concentrating plate 100 according to any one of the above embodiments. The reflective layer 31 is provided on a back surface of the transparent display panel 32, so that when the transparent display panel 32 displays an image, the reflective layer 31 may play a role of reflecting light, thereby improving brightness of displaying of the transparent display panel 32. The light-concentrating plate 100 is provided on the transparent display panel 32 to achieve light concentration. The reflective layer 31 includes a light-transmissive structure 310, and with a light-transmissive structure 310 so that the light-concentrating display screen 300 is used cooperatively with a shooting module to realize the under-screen shooting function. Moreover, the amount of light concentration can be increased, and light concentration with large areas and angles can be achieved. The focusing can be performed via the light-concentrating plate 100. The light-concentrating display screen 300 according to the embodiment of the present disclosure uses the above-mentioned light-concentrating plate 100, which can not only realize image displaying but also perform light concentration.

In one embodiment, the light-concentrating plate 100 is provided on a front surface of the transparent display panel 32, so that the light-concentrating plate 100 directly concentrates light which then passes through the transparent display panel 32. In some other embodiments, the light-concentrating plate 100 may also be provided between the transparent display panel 32 and the reflective layer 31, and the light-concentrating plate 100 concentrates light via the transparent display panel 32.

In one embodiment, referring to FIG. 13. In one embodiment, the transparent display panel 32 includes an OLED layer 321 for emitting light and displaying an image. The light-concentrating plate 100 is provided on a front surface of the OLED layer 321, and the reflective layer 31 is a switch plate 200 according to any one of the above embodiments. Thus, a plurality of switch units 20 of the switch plate 200 may constitute a light-transmissive structure 310 of the reflective layer 31. By using the structure, it can facilitate configuring the position of the shooting module. Of course, in some other embodiments, the reflective layer 31 may also define a through hole in which the switch plate 200 may be provided. Of course, in some other embodiments, the light-concentrating plate 100 may also be provided between the OLED layer 321 and the reflective layer 31. In some other embodiments, referring to FIG. 14, the reflective layer 31 may also be a structure such as a light-reflective film, a light-reflective plate or the like, and the reflective layer 31 may define a light-transmissive hole 311 to form the light-transmissive structure 310.

Figure 14:
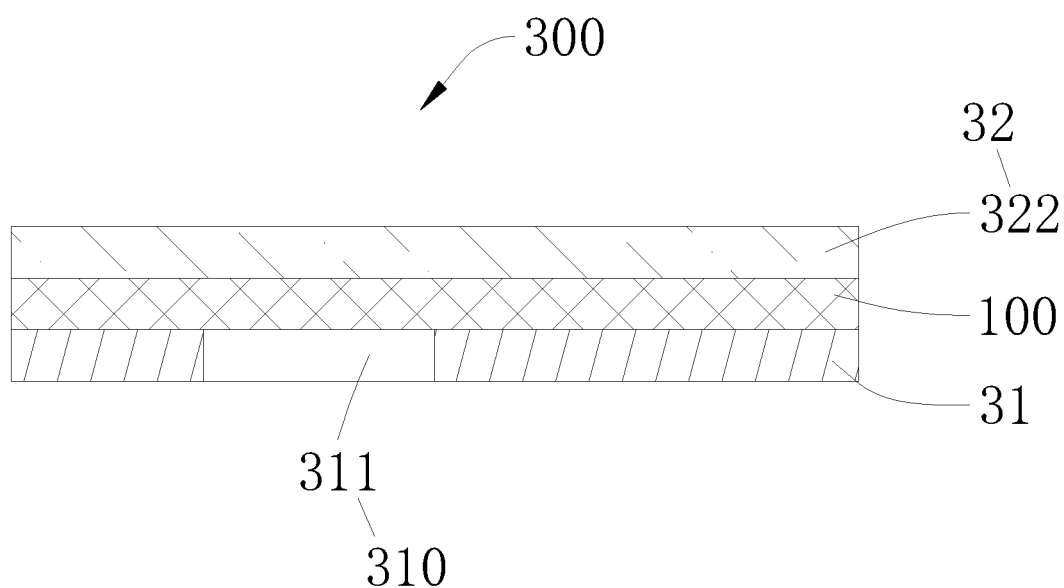
FIG. 14 is a structural diagram of a second type of light-concentrating display screen according to an embodiment of the present disclosure.

In one embodiment, referring to FIG. 14, the transparent display panel 32 includes a Micro LED layer 322 configured for emitting light and displaying an image. The light-concentrating plate 100 is provided between the Micro LED layer 322 and the reflective layer 31. The light-transmissive structure 310 of the reflective layer 31 includes the light-transmissive hole 311 defined by the reflective layer 31. Of course, in some other embodiments, the light-concentrating plate 100 may also be provided on a front surface of the Micro LED layer 322. Of course, in some other embodiments, the reflective layer 31 is a switch plate 200 according to any one of the foregoing embodiments, and then the plurality of switch units 20 of the switch plate 200 may constitute the light-transmissive structure 310 of the reflective layer 31.

Figure 15:
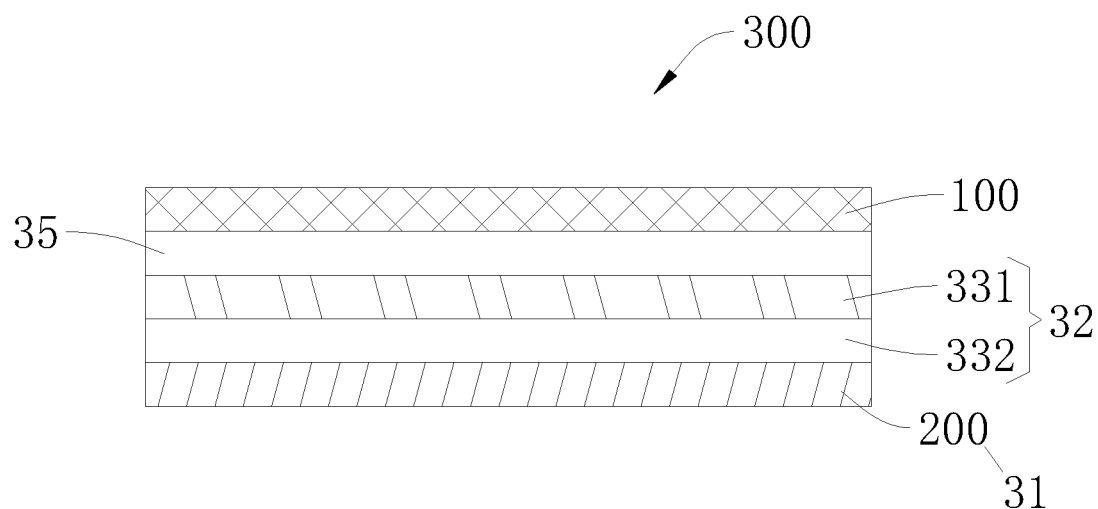
FIG. 15 is a structural diagram of a third type of light-concentrating display screen according to an embodiment of the present disclosure.
Figure 17:
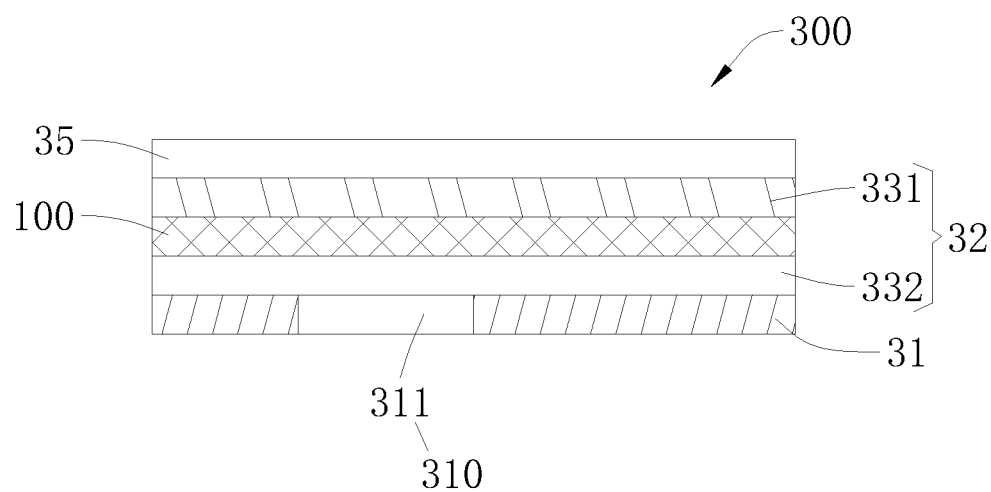
FIG. 17 is a structural diagram of a fifth type of light-concentrating display screen according to an embodiment of the present disclosure.

In one embodiment, referring to FIG. 15, the transparent display panel 32 includes a liquid crystal plate 331 and an LED backlight plate 332 provided on a back surface of the liquid crystal plate 331. The LED backlight plate 332 is configured to provide backlight and to cooperate with the transparent display panel 32 to display images. In one embodiment, the reflective layer 31 is a switch plate 200 according to any one of the foregoing embodiments, and then the plurality of switch units 20 of the switch plate 200 may constitute the light-transmissive structure 310 of the reflective layer 31. By using the structure, it can facilitate configuring the position of the shooting module. Of course, in some other embodiments, the reflective layer 31 may also define a through hole in which the switch plate 200 may be provided. Of course, in one embodiment, referring to FIG. 17, the reflective layer 31 may also define a light-transmissive hole 311 to form the light-transmissive structure 310.

Figure 18:
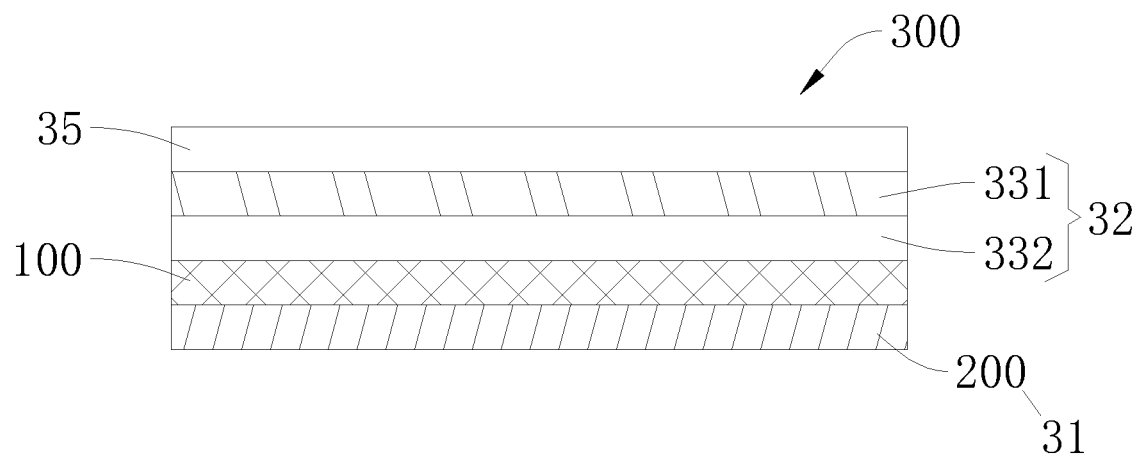
FIG. 18 is a structural diagram of a sixth type of light-concentrating display screen according to an embodiment of the present disclosure.

In one embodiment, referring to FIG. 15, a front surface of the liquid crystal plate 331 is provided with a color filter layer 35, so that the light-light-concentrating display screen 300 cs color image. In one embodiment, the light-concentrating plate 100 is provided on a front surface of the color filter layer 35. In some other embodiments, the light-concentrating plate 100 may be disposed between the liquid crystal plate 331 and the color filter layer 35. In one embodiment, referring to FIG. 17, the light-concentrating plate 100 may also be provided between the liquid crystal plate 331 and the LED backlight plate 332. In one embodiment, referring to FIG. 18, the light-concentrating plate 100 may also be provided between the LED backlight plate 332 and the reflective layer 31.

Figure 16:
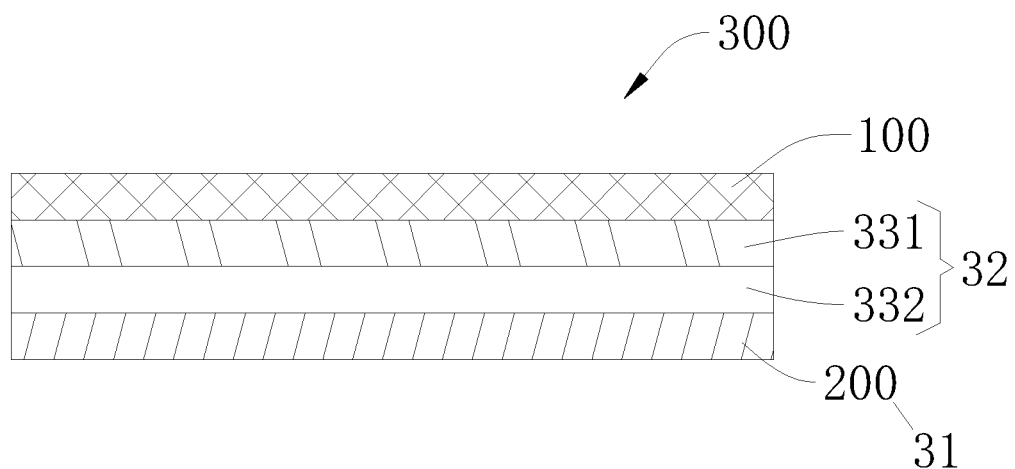
FIG. 16 is a structural diagram of a fourth type of light-concentrating display screen according to an embodiment of the present disclosure.

In one embodiment, referring to FIG. 16, the light-concentrating plate 100 is provided on the front surface of the liquid crystal plate 331, and the reflective layer 31 is provided on the back surface of the LED backlight plate 332. Each house 11 is a color house 11 which transmits one of red light, blue light and green light. Colors of three adjacent houses 11 thereof are arranged in an RGB manner. The light-concentrating plate 100 may realize the function of a color filter, so that the light-concentrating display screen 300 can display color image. Of course, in some embodiments, each house 11 of the light-concentrating plate 100 may also be a transparent structure, and thus the light-concentrating display screen 300 can display black-white image. In some embodiments, each house 11 of the light-concentrating plate 100 may also be a single color, and thus the light-concentrating display screen 300 may display a single color image.

Figure 19:
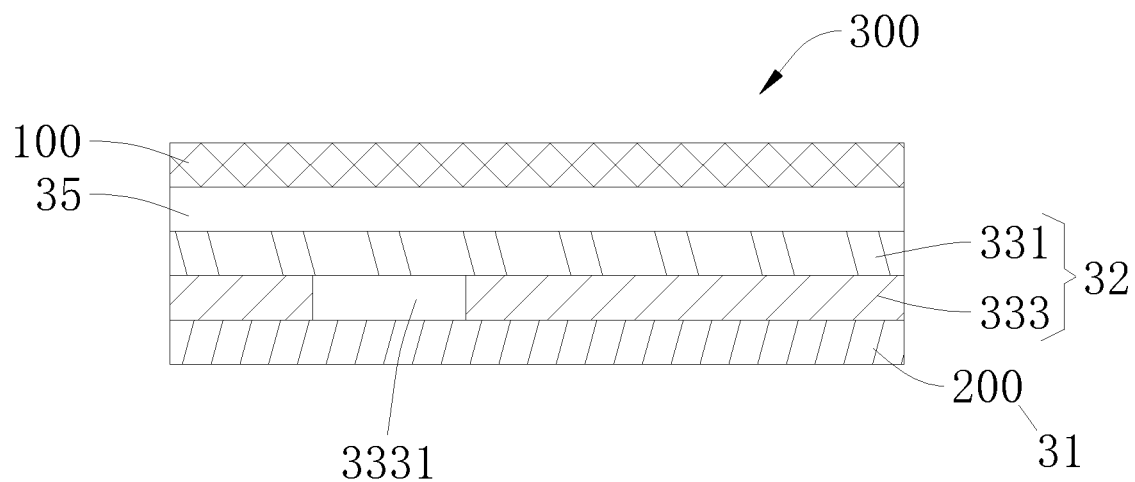
FIG. 19 is a structural diagram of a seventh type of light-concentrating display screen according to an embodiment of the present disclosure.

In one embodiment, referring to FIG. 19, the transparent display panel 32 includes a liquid crystal plate 331 and a light guide plate 333 provided on a back surface of the liquid crystal plate 331. The light guide plate 333 is configured to guide light to provide backlight for the liquid crystal plate 331. The reflective layer 31 is provided on a back surface of the light guide plate 333. A position of the light guide plate 333 corresponding to the light-transmissive structure 310 defines a through hole 3331. The light-concentrating plate 100 is provided on the liquid crystal plate 331, so that after the light-concentrating plate 100 concentrates light, the concentrated light may enter the light-transmissive structure 310 via the through hole 3331 of the light guide plate 333.

The light-concentrating display screen 300 according to the embodiment of the present disclosure may realize light-concentrating, dimming, and focusing by screen; and may concentrate light with large areas, extract light at large angles, and improve light flux. The light-concentrating display screen 300 according to the embodiment of the present disclosure may be applied to devices for under-screen lighting, such as under-screen shooting and under-screen fingerprint.

Figure 20:
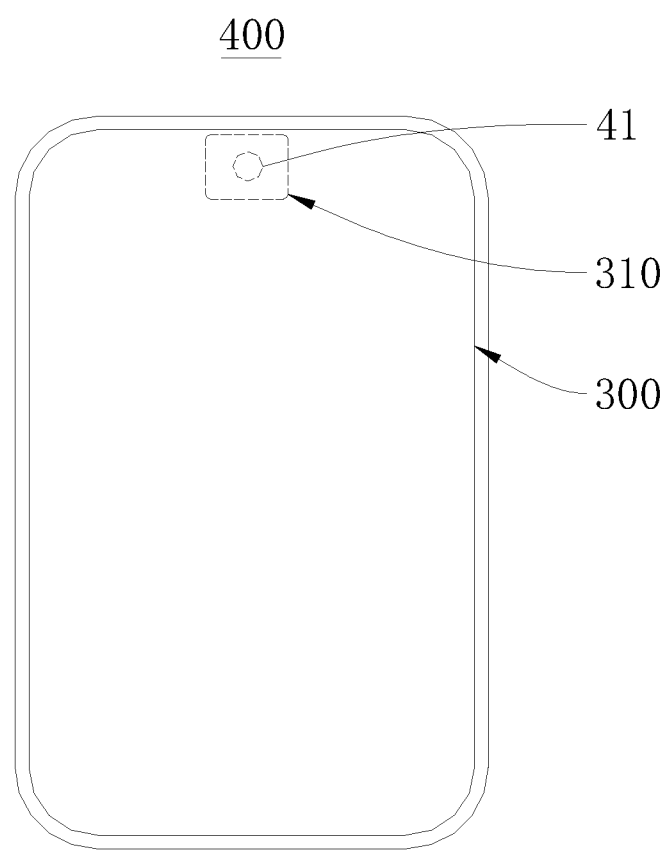
FIG. 20 is a structural diagram of a mobile terminal according to an embodiment of the present disclosure.
Figure 21:
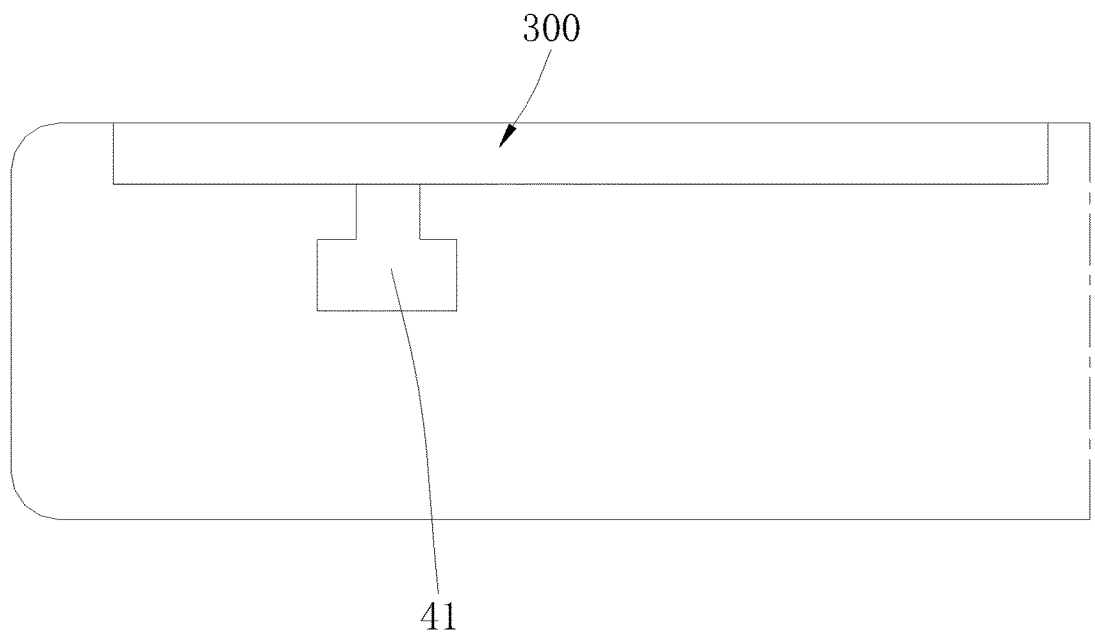
FIG. 21 is a partially cross-sectional structural diagram of the mobile terminal of FIG. 20.

Referring FIGS. 20 and 21, embodiments of the present disclosure further provide a mobile terminal 400. The mobile terminal 400 includes a camera module 41 and a light-concentrating display screen 300 according to any one of the above embodiments. The camera module 41 is provided at a corresponding position of the light-transmissive structure 310. The mobile terminal 400 according to the embodiments of the present disclosure, by including the above-mentioned light-concentrating display screen 300, can have no opening or through hole on the screen and increase a screen ratio. Moreover, the light-concentrating display screen 300 can be directly used for light concentrating and focusing, and the camera module 41 can obtain more light, thereby improving the shooting quality. In one embodiment, the mobile terminal 400 can be a cell phone.

Figure 22:
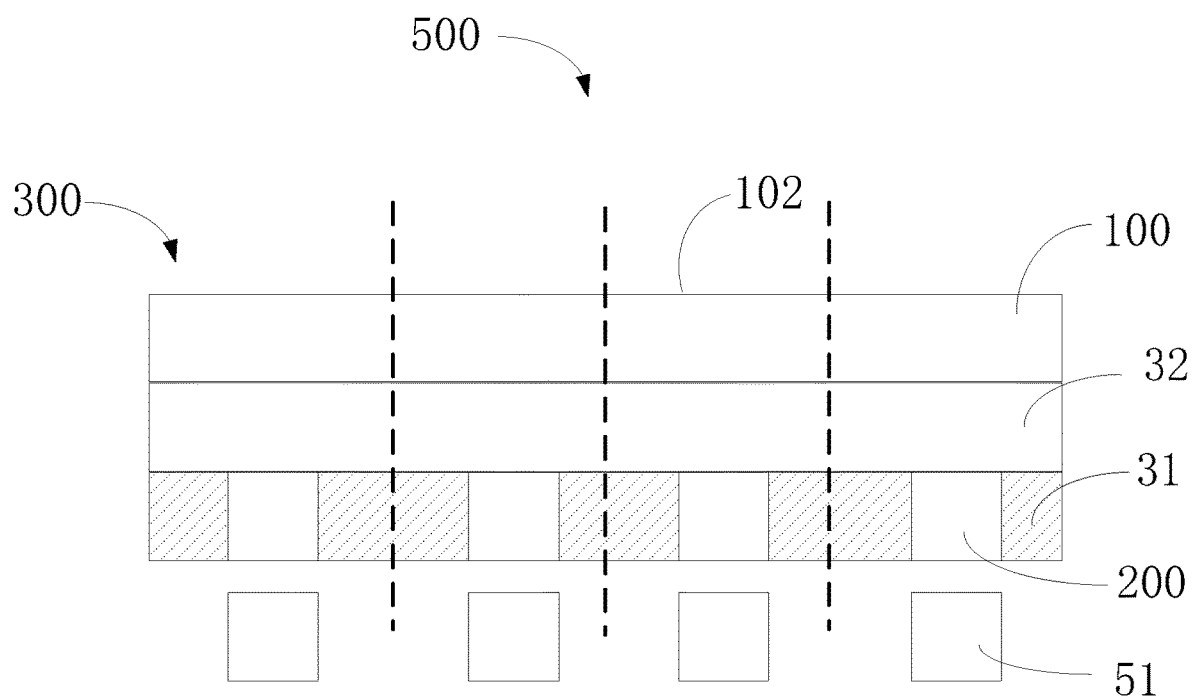
FIG. 22 is a structural diagram of a computer terminal according to an embodiment of the present disclosure.

Referring FIG. 22, embodiments of the present disclosure further provide a terminal 500. The terminal 500 includes a plurality of camera modules 51 arranged to form an array and a light-concentrating display screen 300 according to any one of the above embodiments. The light-concentrating display screen 300 includes a transparent display panel 32, a reflective layer 31, and a light-concentrating plate 100. The reflective layer 31 defies a plurality of through holes and each of the through holes is provided with a switch plate 200. The light-concentrating plate 100 is divided in to a plurality of regions 102, and each of the plurality of regions 102 corresponds to one of the switch plates 200 and controlled to concentrate light to the corresponding switch plate 200. Each of the plurality of camera modules 51 is located to correspond to one of the switch plates 200. In one embodiment, the terminal 500 can be a personal computer or a television.

It is to be understood that the above-described example embodiments are intended to illustrate rather than limit the disclosure. Any elements described in accordance with any example embodiments is understood that they can be used in addition or substituted in other example embodiments. Example embodiments can also be used together. Variations can be made to the example embodiments without departing from the spirit of the disclosure. The above-described example embodiments illustrate the scope of the disclosure but do not restrict the scope of the disclosure.

Depending on the example embodiment, certain of the actions of methods described can be removed, others can be added, and the sequence of actions can be altered. It is also to be understood that the description and the claims drawn to a method may include some indication in reference to certain actions. However, the indication used is only to be viewed for identification purposes and not as a suggestion as to an order for the actions.

What is claimed is:

1. A light-concentrating device, comprising: a light-concentrating plate, wherein the light-concentrating plate comprises a plurality of dimming units arranged in an array, and each of the plurality of dimming units comprises:
   a house, wherein the house comprises a first wall, a second wall opposite to the first wall, and a side wall connected to both the first wall and the second wall, and the house allows light to pass through at least from the first wall to the second wall;
   a first light-transmissive liquid filled in the house, wherein the first light-transmissive liquid is a conductive liquid;
   a first electrode layer located on the second wall, wherein the first electrode layer allows the light to pass through; and
   an adjustment electrode located on the side wall of the house, wherein the adjustment electrode is insulated from the first electrode layer;
   wherein the first wall is a light-transmissive layer, the second wall is an insulating layer, and the first electrode layer is located on a side of the insulating layer facing away from the first wall; and the plurality of dimming units share a common light-transmissive layer, a common insulating layer, and a common first electrode layer.

2. The light-concentrating device according to claim 1, wherein each of the plurality of dimming units further comprises a second light-transmissive liquid filled in the house, wherein the second light-transmissive liquid is a non-conductive liquid, and the first light-transmissive liquid and the second light-transmissive liquid are insoluble with each other; and a first affinity between the second wall and the second light-transmissive liquid is different from a second affinity between the second wall and the first light-transmissive liquid.

3. The light-concentrating device according to claim 1, wherein the house comprises four side walls, and each of the four side walls are provided with a plurality of adjustment electrodes, and two adjacent of the plurality of adjustment electrodes are insulated from each other and located at intervals.

4. The light-concentrating device according to claim 3, wherein the plurality of adjustment electrodes extend along a direction substantially parallel to or perpendicular to the first electrode layer.

5. The light-concentrating device according to claim 1, wherein each of the plurality of dimming units further comprises a second electrode layer located on the first wall, and the second electrode layer allows the light to pass through.

6. The light-concentrating device according to claim 1, further comprising a controller connected to the adjustment electrode and the first electrode layer and configured to apply a voltage between the adjustment electrode and the first electrode layer.

7. A light-concentrating display screen, comprising a transparent display panel, a reflective layer located on the transparent display panel and comprising a light-transmissive structure, and a light-concentrating device comprising a light-concentrating plate located on the transparent display panel, wherein the light-concentrating plate comprises a plurality of dimming units arranged in an array, and each of the plurality of dimming units comprises:
   a house, wherein the house comprises a first wall, a second wall opposite to the first wall, and a side wall connected to both the first wall and the second wall; and the house allows light to pass through at least from the first wall to the second wall;
   a first light-transmissive liquid filled in the house, wherein the first light-transmissive liquid is a conductive liquid;
   a first electrode layer located on the second wall, wherein the first electrode layer allows the light to pass through; and
   an adjustment electrode located on the side wall of the house, wherein the adjustment electrode is insulated from the first electrode layer.

8. The light-concentrating display screen according to claim 7, wherein each of the plurality of dimming units further comprises a second light-transmissive liquid filled in the house, wherein the second light-transmissive liquid is a non-conductive liquid, and the first light-transmissive liquid and the second light-transmissive liquid are insoluble with each other; the first wall is a light-transmissive layer, the second wall is an insulating layer, and the first electrode layer is located on a side of the insulating layer facing away from the first wall; and the plurality of dimming units share a common light-transmissive layer, a common insulating layer, and a common first electrode layer.

9. The light-concentrating display screen according to claim 8, wherein a first affinity between the second wall and the second light-transmissive liquid is different from a second affinity between the second wall and the first light-transmissive liquid.

10. The light-concentrating display screen according to claim 7, wherein the house comprises four side walls, and each of the four side walls are provided with a plurality of adjustment electrodes, and two adjacent of the plurality of adjustment electrodes are insulated from each other and located at intervals.

11. The light-concentrating display screen according to claim 10, wherein the plurality of adjustment electrodes extend along a direction substantially parallel to or perpendicular to the first electrode layer.

12. The light-concentrating display screen according to claim 10, wherein each of the plurality of dimming units further comprises a second electrode layer located on the first wall, and the second electrode layer allows the light to pass through.

13. The light-concentrating display screen according to claim 7, the light-concentrating device further comprises a controller connected to the adjustment electrode and the first electrode layer and configured to apply a voltage between the adjustment electrode and the first electrode layer.

14. The light-concentrating display screen according to claim 7, wherein the transparent display panel comprises a liquid crystal plate and a LED backlight plate; and the house is a color house and allows only one of red light, blue light, and green light to pass through, and colors of three adjacent houses are arranged in an RGB manner.

15. The light-concentrating display screen according to claim 7, wherein the light-transmissive structure comprises a plurality of switch units, and each of the switch units comprises:
 a dam;
 a light-transmissive electrode layer located on an end of the dam;
 an insulating transparent layer located on the other end of the dam; and
 a light-transmissive conductive layer located on the insulating transparent layer, wherein the dam, the light-transmissive electrode layer and the insulating transparent layer cooperatively form a sealed chamber; and
 a light-transmissive conductive liquid and a light-reflective liquid filled in the sealed chamber, wherein the light-transmissive conductive liquid and the light-reflective liquid are insoluble with each other, the light-reflective liquid is a light-reflective and non-conductive liquid, and an affinity between the insulating transparent layer and the light-reflective liquid is greater than an affinity between the insulating transparent layer and the light-transmissive conductive liquid.

16. An electric product, comprising a camera module and a light-concentrating display screen; the light-concentrating display screen comprises a transparent display panel, a reflective layer located on the transparent display panel and comprising a light-transmissive structure, and a light-concentrating device comprising a light-concentrating plate located on the transparent display panel; the camera module being located on a corresponding position of the light-transmissive structure, wherein the light-concentrating plate comprises a plurality of dimming units arranged in an array, and each of the plurality of dimming units comprises:
 a house, wherein the house comprises a first wall, a second wall opposite to the first wall, and a side wall connected to both the first wall and the second wall; and the house allows light to pass through at least from the first wall to the second wall;
 a first light-transmissive liquid filled in the house, wherein the first light-transmissive liquid is a conductive liquid;
 a first electrode layer located on the second wall, wherein the first electrode layer allows the light to pass through; and
 an adjustment electrode located on the side wall of the house, wherein the adjustment electrode is insulated from the first electrode layer.

17. The electric product according to claim 16, wherein the first wall is a light-transmissive layer, the second wall is an insulating layer, and the first electrode layer is located on a side of the insulating layer facing away from the first wall; and the plurality of dimming units share a common light-transmissive layer, a common insulating layer, and a common first electrode lay.

18. The electric product according to claim 16, wherein the house comprises four side walls, and each of the four side walls are provided with a plurality of adjustment electrodes, and two adjacent of the plurality of adjustment electrodes are insulated from each other and located at intervals.

19. The electric product according to claim 16, wherein each of the plurality of dimming units further comprises a second light-transmissive liquid filled in the house, wherein the second light-transmissive liquid is a non-conductive liquid, and the first light-transmissive liquid and the second light-transmissive liquid are insoluble with each other.

* * * * *